Oct. 21, 1952  C. W. TAYLOR  2,614,576
AUTOMATIC FLOAT TRANSFER VALVE
Filed Aug. 17, 1950
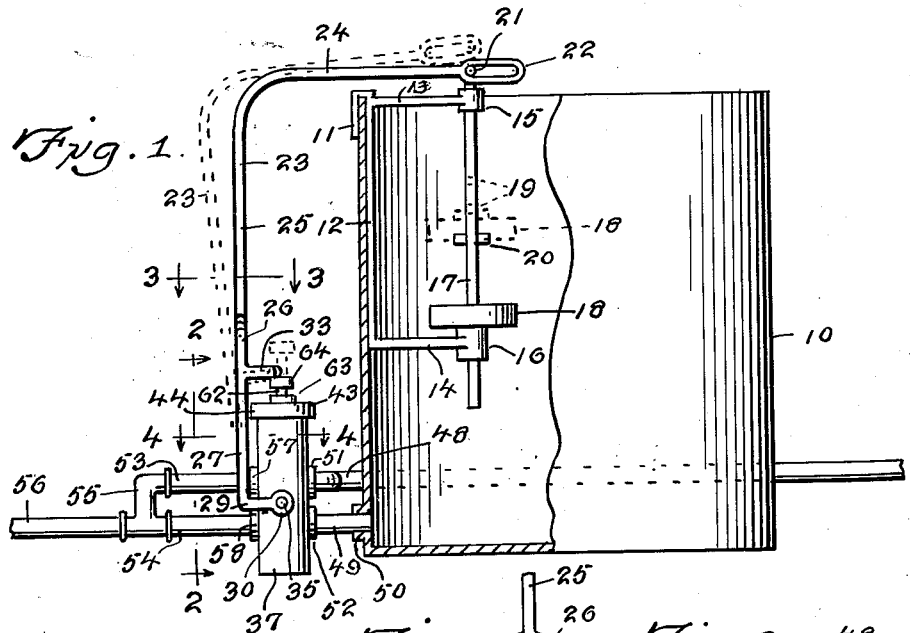
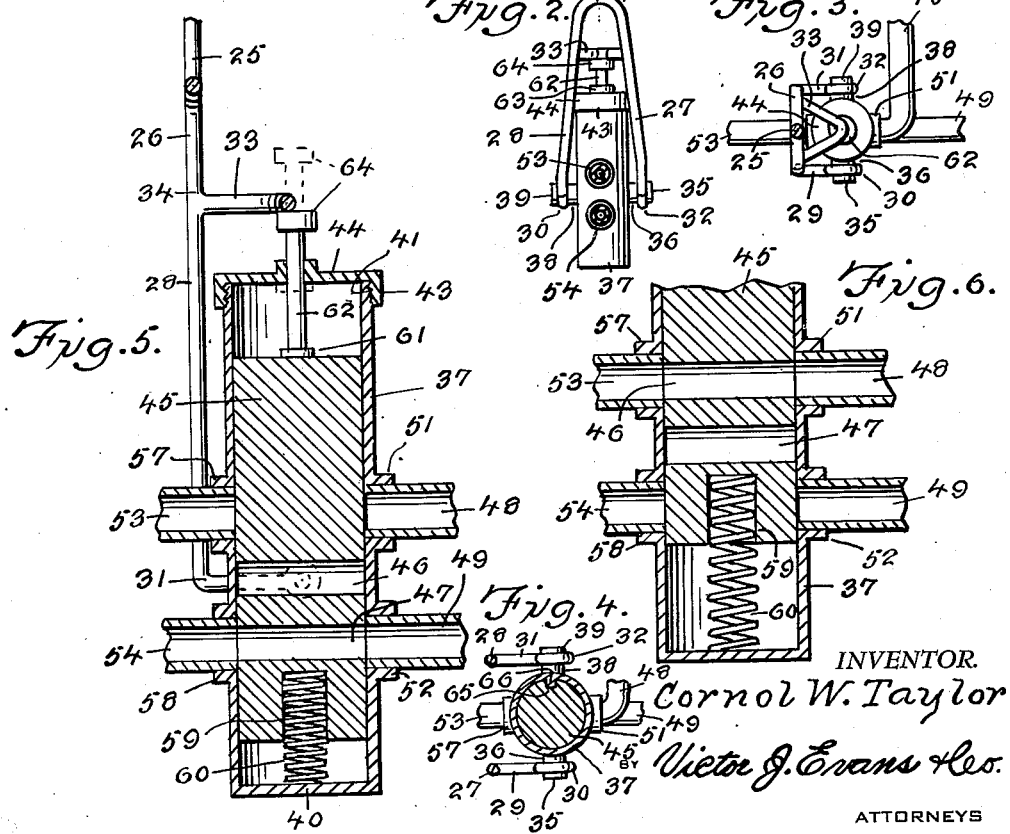
INVENTOR.
Cornol W. Taylor
Victor J. Evans & Co.
ATTORNEYS Patented Oct. 21, 1952

2,614,576

UNITED STATES PATENT OFFICE 2,614,576

AUTOMATIC FLOAT TRANSFER VALVE

Cornol W. Taylor, Holdenville, Okla.

Application August 17, 1950, Serial No. 179,926

4 Claims. (Cl. 137—122)

This invention relates to a float controlled valve, and more especially to an automatically controlled fluid transfer or diverting apparatus and is a continuation in part of my pending application for Automatic Float Transfer Valve bearing Serial No. 655,293 filed March 18, 1946, and now abandoned.

The primary object of the present invention is the provision of an apparatus of this character, wherein through the working thereof fluid is automatically diverted from one receptacle to another, and this is effected by a float controlled valve, the apparatus being of novel construction and is unique in the assembly of its parts, which are actuated through automatic control action.

Another object of the present invention is the provision of an apparatus of this character, wherein its use with oil tank systems will enable the oil flow to be diverted from one tank to another, and thereby regulating the level of the oil in the respective tanks for the filling thereof.

A further object of the present invention is the provision of an apparatus of this character, which is simple in construction, thoroughly reliable and efficient in operation, and automatic in the working thereof, positive in action, strong, durable and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation of the apparatus constructed in accordance with the invention, the oil tank being partly broken away for the disclosure of the float therein and showing in dotted lines the position of the apparatus after the operation thereof by the float.

Figure 2 is an elevational view of the float controlled valve taken on the line 2—2 of Figure 1.

Figure 3 is a top plan view of the float controlled valve taken on the line 3—3 of Figure 1.

Figure 4 is a fragmentary sectional view taken on the line 4—4 of Figure 1.

Figure 5 is an enlarged detail vertical sectional view of the float valve in one position to control the flow of liquid to one set of tanks.

Figure 6 is an enlarged fragmentary sectional view similar to Figure 5 disclosing the valve controlling the flow of liquid to another set of tanks.

Referring more in detail to the drawings the numeral 10 designates generally one of several oil storage tanks. Secured to the upper periphery of the tank 10 by a hook shaped end 11 is a float hanger 12 having integral therewith an offset rightangularly directed upper arm 13 and an offset rightangularly directed lower arm 14. The outer end of the arm 13 is provided with an enlarged guide portion 15 while the outer end of the arm 14 is provided with the enlarged guide portion and float rest 16.

Mounted for vertical sliding movement in the guide portions 15 and 16 respectively is the float carrier 17 on which is mounted for sliding movement the float 18. If the level of the contents of the tank 10 is below the portion 16 the float 18 will rest thereon. However, as the level of the contents rises the float 18 will ride the level of the contents of the tank 10 and will slide upwardly on the carrier 17 as the level of the contents rises.

The carrier 17 is provided with a plurality of relatively spaced traverse openings 19 which receive a stop pin 20. Thus with the pin 20 selectively engaged in either of the openings 19 the float 18 will upon engagement with the pin 20 cause the float 18 to slide the carrier 17 upwardly within the guide portions 15 and 16 respectively.

The upper end of the carrier 17 which projects above the upper periphery of the tank 10 is provided with a projection 21 which is engaged in the elongated eye or loop portion 22 of the L-shaped operating lever 23.

The lever 23 is provided with a horizontal portion 24 which is parallel to a plane passing transversely of the tank 10 and a vertical portion 25 which is parallel to the vertical axis of the tank 10.

The lower end of the portion 25 of the lever 23 is provided with a yoke 26 having portions 27 and 28 respectively. The lower end of the portion 27 has a rightangularly directed extension 29 having an enlarged apertured ear 30 on the outer end thereof, while the lower end of the portion 28 is provided with a rightangularly directed extension 31 having an enlarged apertured ear 32 on the outer end thereof. Intermediate of the portions 27 and 28 there is connected thereto a V-shaped rightangularly and inwardly directed projection 33 the operation of which will be later explained.

The projection 33 may be connected to the portions 27 and 28 by welding 34 or it may be formed integral with such portions or connected thereto in any other well known manner.

The apertured ear 30 of the extension 29 is pivotedly mounted on the pivot 35 which is integral with the projection 36 on the outer surface of the cylindrical valve stand or housing 37. Diametrically opposed to the projection 36 on the outer surface of the housing 37 is a similar projection 38 having the integral pivot 39 for pivoting the apertured ear 32 of the extension 31.

The housing 37 has a closed bottom 40 and an open top 41 and the outer surface of the housing 37 adjacent the open top is provided with screw threads 42. The screw threads 42 detachably engage the internally threaded annular flange 43 of the cap or cover 44.

Mounted for reciprocation in the housing 37 is the valve body or piston 45 having the separate transverse flow passages 46 and 47 respectively therein. The passages 46 and 47 will alternately communicate with independent flow or feed pipes 48 and 49 respectively as will be later described. The pipe 49 will be connected with the flanged inlet 50 of the tank 10 while the pipe 48 will be similarly connected to another storage tank not shown. The pipes 48 and 49 at their ends opposite to the ends connected to the tanks are connected to the flanged outlets 51 and 52 respectively of the housing 37. The pipes 53 and 54 are connected to a coupling 55 to a main supply or feeder pipe 56 at one end while the other ends are connected to the flanged inlets 57 and 58 of the housing 37 which are in alinement with and diametrically opposed to outlets 51 and 52 respectively.

The lower end of the valve body or piston 45 is provided with a centrally located smooth bore 59 in which is seated the upper end of the expansion spring 60 the lower end of which rests on and engages the inner surface of the bottom 40 of the housing 37.

The upper end of the valve body or piston 45 engages the enlarged lower end 61 of the operating pin 62 which is slidably mounted in the centrally located flanged opening 63 in the cap 44. The upper end of the pin 62 has a head or button 64 thereon which will engage the V-shaped projection 33 on the portions 28 and 29 as will be later described.

Viewing Figure 4 it will be noted that the valve body or piston 45 is provided with a groove 65 which extends longitudinally thereof and engages an inwardly directed pin 66 on the inner surface of the housing 37. The engagement of the pin with the groove prevents rotation of the valve body or piston 45 within the housing 37.

In operation with the float 18 resting on the portion 16 the pin 62 is manually depressed engaging the valve body or piston 45 and urging the same downwardly in the housing 37 against the action of the spring 60. The projection 33 is then engaged with the head 64 of the pin as in Figure 5. In this position the passage 47 of the valve body or piston 45 is in alinement with pipe 54 and inlet 58 and outlet 52 and pipe 49. Thus the flow from the main line 56 will enter pipe 54 passing through passage 47 out through outlet 52 into pipe 49 and thence into inlet 50 of the tank 10. As the level of the contents in the tank 10 rises it will engage the float 18 causing it to slide upwardly on the carrier 17 until it engages the pin 20. The float will then urge the carrier 17 upwardly causing the lever 23 to be moved to the position shown in dotted lines Fig. 1. The action of the lever causes the projection 33 to become disengaged from the head 64 of the pin 62. The spring 60 will then urge the valve body or piston 45 upwardly to the position shown in Figure 6.

In this position the passage 46 of the valve body or piston 45 is in alinement with the inlet 57 and pipe 53 and outlet 51 and pipe 48. Thus the flow from the main pipe 56 will be diverted to another storage tank through the pipe 48, the flow through passage 46 and outwardly of outlet 51.

If the tank 10 later becomes empty the valve body or piston is manually reset as previously described and the operation will be repeated as previously described. It will be noted that the pin 20 is selectively engaged in the openings 19 to cause the float to engage the pin at any desired level of the contents of the tank.

It will be seen, therefore, that through an oil distributing system wherein the invention may be used, that a series of tanks may be selectively filled as soon as one of the tanks is filled and so on until all tanks are filled.

Having thus described the invention what is claimed as new and desired to be covered by Letters Patent is:

1. An apparatus of the kind described, comprising a fluid storage tank, a float operating therein, a valve housing, a flow diverting valve means within the housing and having a pair of fluid passages therein, flow diverting pipes communicating with the housing, one pipe leading into the tank, each of said pipes being adapted to be alternately placed in communication with said passages, respectively, spring means in said housing forcing said valve means in one direction for placing one of said passages in communication with one of said pipes, an operating lever pivoted on said housing adapted to hold said valve means down against the action of the spring into a position to maintain the second of said passages in communication with the other of said pipes, an operating connection between the float and the lever and operated by the float for releasing said lever so that said spring will move said valve means into said first position to open said first passage and close said second passage and means for varying the action of the float and said operating lever is provided on its lower end with a yoke and said yoke is provided with right angularly extending extensions thereon which are pivotally mounted on the opposite sides of said housing.

2. The invention as in claim 1 wherein means is supported by said tank for controlling the movement of said float.

3. The invention as in claim 1 wherein an operating pin is carried by said housing for engagement with said valve means and said lever is provided with means for engaging said pin for holding said valve means depressed.

4. An apparatus of the kind described, comprising a fluid storage tank, a float operating therein, a valve housing, a flow diverting valve means within the housing and having a pair of fluid passages therein, flow diverting pipes communicating with the housing, one pipe leading into the tank, each of said pipes being adapted to be alternately placed in communication with said passages, respectively, spring means in said housing forcing said valve means in one direction for placing one of said passages in communication with one of said pipes, an operating lever pivoted on said housing adapted to hold said valve means down against the action of the spring into a position to maintain the second of said passages in communication with the other of said pipes, an operating connection between the float and the lever and operated by the float for releasing said lever so that said spring will move said valve means into said first position to open said first passage and close said second passage and means for varying the action of the float and said tank is provided with a hanger supported on the upper periphery thereof, a float carrier carried by said hanger for the mounting of said float thereon, operating means between said carrier and said lever, means on said lever for pivoting said lever on said housing and means on said lever for holding said valve means depressed.

CORNOL W. TAYLOR.

REFERENCES CITED

The following references are of record in the file of this patent:

UNITED STATES PATENTS

| Number | Name | Date |
| --- | --- | --- |
| 1,736,933 | Morgan | Nov. 26, 1929 |
| 1,864,021 | Jack | June 21, 1932 |
| 1,999,095 | Gregory | Apr. 23, 1935 |